(12) United States Patent
Collins et al.

(10) Patent No.: US 7,500,194 B2
(45) Date of Patent: Mar. 3, 2009

(54) APPLYING A SLIDE LAYOUT WITH AN ARBITRARY NUMBER OF PLACEHOLDERS

(75) Inventors: Nathalie S. Collins, Sunnyvale, CA (US); Hoa N. Lu, Oakland, CA (US); Dennis Coh, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 11/129,773

(22) Filed: May 13, 2005

(65) Prior Publication Data

US 2006/0259858 A1     Nov. 16, 2006

(51) Int. Cl.
*G06F 3/00*     (2006.01)
*G06F 3/14*     (2006.01)
*G06F 17/00*    (2006.01)

(52) U.S. Cl. .................. 715/732; 715/731; 715/760; 715/765; 715/234; 715/243

(58) Field of Classification Search ............. 715/730, 715/731, 732, 760, 762, 764, 765, 866, 200, 715/204, 205, 209, 243, 246, 253, 908
See application file for complete search history.

(56) References Cited

U.S. PATENT DOCUMENTS

| | | | | |
|---|---|---|---|---|
| 5,363,482 | A * | 11/1994 | Victor et al. ............... | 715/804 |
| 7,194,680 | B1 * | 3/2007 | Roy et al. .................. | 715/205 |
| 7,236,632 | B2 * | 6/2007 | Erol et al. .................. | 382/218 |
| 2004/0255003 | A1 * | 12/2004 | Tecu et al. .................. | 709/217 |
| 2005/0125722 | A1 * | 6/2005 | Mistry et al. ................ | 715/513 |
| 2005/0171758 | A1 * | 8/2005 | Palmquist .................... | 704/4 |
| 2005/0216431 | A1 * | 9/2005 | Baker et al. ................. | 707/1 |
| 2007/0055939 | A1 * | 3/2007 | Furlong et al. .............. | 715/731 |

OTHER PUBLICATIONS

"Create Better and More Effective Presentations", PowerPoint Basics, Microsoft PowerPoint 2003, level 100, University of Nebraska, updated Dec. 14, 2005, 8 pages.*
Julie Terberg, "Solid slide structure in PowerPoint 2002 prevents jumping graphics and text", May 2003, Presentations.com, 2 pages.*
Trevor Meers, "Slide & Title Masters", Microsoft PowerPoint 2002, Aug. 2004, Quick Studies, vol. 15, issue 8, 2 pages.*
H. Hyatt, "Tips on How to Make a PowerPoint Presentation", Jan. 2002, Teaching & Research Support Unit, 8 pages.*

* cited by examiner

*Primary Examiner*—X. L Bautista
(74) *Attorney, Agent, or Firm*—Merchant & Gould

(57) ABSTRACT

A new slide layout having an arbitrary number of placeholders is applied to an existing slide. Placeholders in an original slide are mapped to placeholders within a new slide layout configuration. The slide layouts may be predefined slide layouts that include a predetermined number of placeholders or customized slide layouts that include an arbitrary number of placeholders. The placeholders in the original slide are mapped to a new slide layout that may have fewer, the same, or more placeholders than the original slide layout. The placeholders may be matched based on many different criteria, including, the function of the placeholder; the name of the placeholder; the type of the placeholder; and the position ID of the placeholder.

8 Claims, 5 Drawing Sheets

APPLYING A SLIDE LAYOUT WITH AN ARBITRARY NUMBER OF PLACEHOLDERS

BACKGROUND OF THE INVENTION

Many individuals and businesses prepare and deliver presentations using a computer presentation program. Typically, presentation programs allow the user to edit, create, and present slides using their computer. A user selects from predefined slide layouts and then configures the set of slides for their presentation based on the predefined layout that was selected. Conveying the look and feel the user desires, however, may be difficult to achieve.

SUMMARY OF THE INVENTION

Embodiments of the present invention are related to applying a slide layout having an arbitrary number of placeholders.

According to one aspect of the invention, placeholders are mapped from an original slide layout to a new slide layout. The slide layouts may be predefined slide layouts that include a predetermined number of placeholders or customized slide layouts that may include an arbitrary number of placeholders.

According to another aspect of the invention, a layout algorithm maps placeholders within an original slide layout into a new slide layout that has fewer, the same, or more placeholders than contained within the original slide layout.

According to another aspect of the invention, a best match determination is conducted to determine the mapping of placeholders between slide layouts. The placeholders are examined to determine characteristics associated with them, such as: the function of the placeholder; the name of the placeholder; the type of the placeholder; and the position ID of the placeholder. The best match for a placeholder is found by cycling through the placeholders on the original slide and matching them up against the list of unmatched placeholders in the new layout.

DETAILED DESCRIPTION OF THE PREFERRED EMBODIMENT

Generally, embodiments of the present invention are related to applying a slide layout having an arbitrary number of placeholders. Placeholders in an original slide layout are mapped to placeholders within a new slide layout configuration. The slide layouts may be predefined slide layouts that include a predetermined number of placeholders or customized slide layouts that include an arbitrary number of placeholders. The placeholders in the original slide layout are mapped to a new slide layout that may have fewer, the same, or more placeholders than the original slide layout. The placeholders may be matched based on many different criteria, including, the function of the placeholder; the name of the placeholder; the type of the placeholder; and the position ID of the placeholder.

Illustrative Slide Layout System and Method

Figure 2:
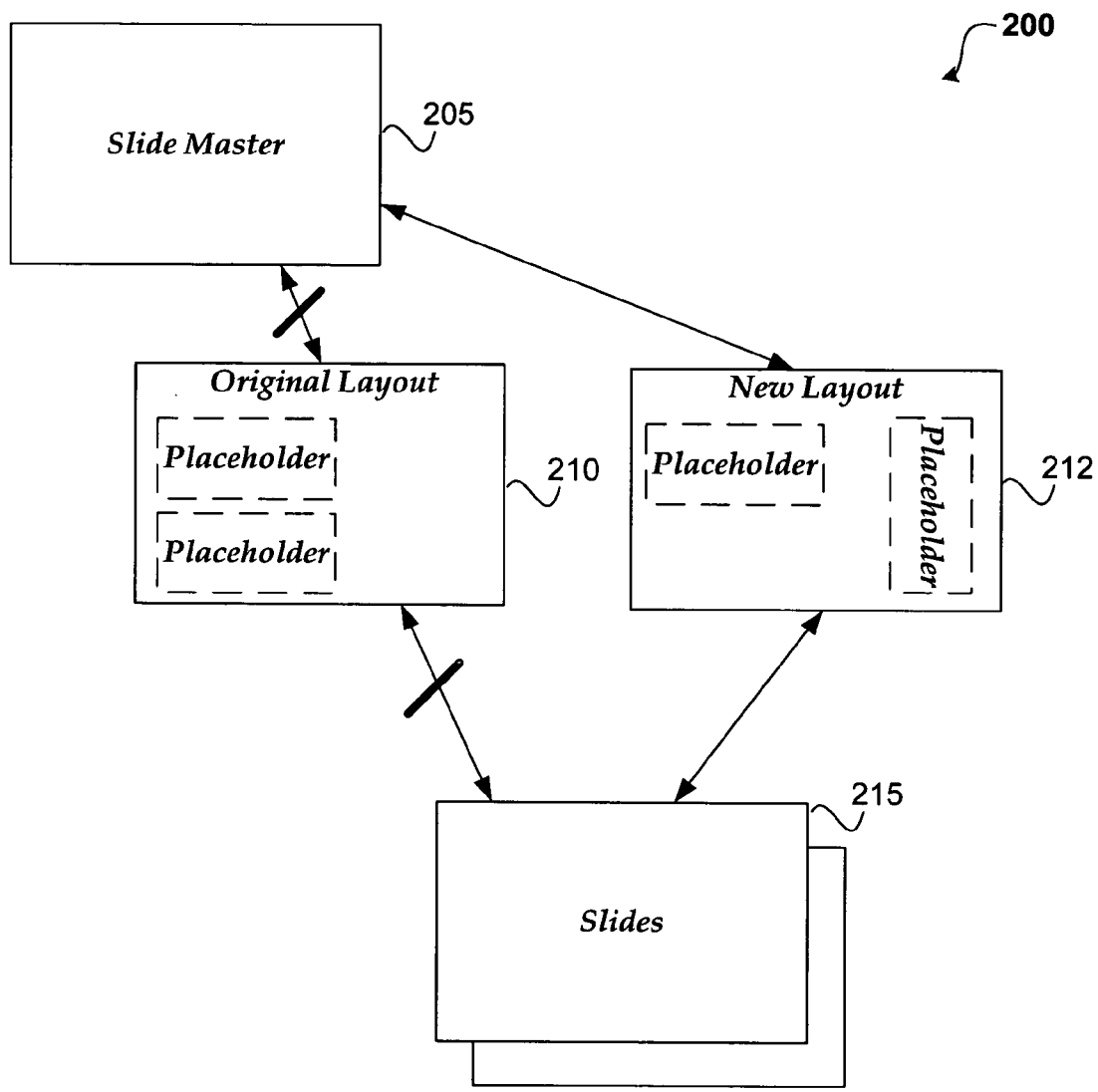
FIG. 2 shows a general overview of an inheritance model between slides within a presentation and applying a new layout.

FIG. 2 shows a general overview of an inheritance model between slides within a presentation and applying a new layout, in accordance with aspects of the present invention. Referring to FIG. 2, three hierarchical layers are illustrated within the system including slide master 205, original layout 210, new layout 212 and slide(s) 215.

According to one embodiment of the invention, each presentation includes at least one slide master (205) and each slide master may include at least zero or more layouts that may be associated with zero or more slides (215). Slide master 205 is at the highest level within the hierarchy. Original layout 210 and new layout 212 are located at the second level within the hierarchy and the slides (215) are at the third level within the hierarchy. Slides 215, therefore, inherit their corresponding properties from associated layouts and the layouts inherit properties from an associated slide master. Changes made to the slide master propagate to the layout level and then propagate to the slide level. Changes made to the layout propagate down to the associated slides. Therefore, when a new layout is applied, the changes are propagated down to the slides (215). When an exception can be made to a property at one or more of the hierarchical levels, that overrides the inheritance of that property from parent layers.

Slide master 205 helps to enable presentation authors to create an overall look and feel for a presentation. More than one slide master may be included within the presentation. The slide master(s) determines the styles and background for the presentation. The slide master defines characteristics including background, layout, color scheme and text styles associated with the presentation. Slide masters also store the global placeholder and text style definition that is the default for a layouts' position and size of: title placeholders; header, footer and slide placeholders.

One or more layouts are used to define properties, such as the geometries, associated with slides 215. According to one embodiment, a default list of predefined layouts are provided. These predefined layouts include a predefined number of placeholders and may represent many different layouts. Presentation authors can also add additional custom layouts having an arbitrary number of placeholders that can be used and that are based on their own design criteria. Presentation authors may also apply a new layout to existing slides to create a new look and feel for a presentation.

Slides point to layouts for their placeholder and slide-level properties. Generally, layouts (both predefined and custom) derive the default position of their title, date/time, footer, and slide number placeholders from their counterparts on the master. For each of these placeholders, if no size or position changes have been made on the layout, then their position/size is inherited from the master. Each layout, such as original layout 210 and new layout 212, may include its own number and arrangement of body placeholders that share the global style definition from the slide master by default, but may also store unique size and position information for each layout.

Initially, slides 215 point to original layout 210. When a new layout is applied, such as new layout 212, the slides (215) pointing to the original layout (210) now point to new layout 212 and any change made as a result of applying the new layout is reflected in the slides that use that layout unless the slide specifically provides an exception. After the new layout is applied, when any formatting change is made to the new layout (212) all of its children inherit the change unless an exception to that type of change is provided within the child. According to one embodiment, if a placeholder is added to a new layout its existing children are not affected. Newly created slides based on this layout, however, will include the additional placeholder.

When new layout 212 is applied to original layout 210, the placeholders across the layouts are attempted to be matched (See FIGS. 3-6 and related discussion). Applying the new layout allows the presentation author to change the look and feel of a slide (background formatting, placeholder properties, etc.). This helps to enable template designers to define graphical elements and formatting properties specific to a given slide layout.

Figure 3:
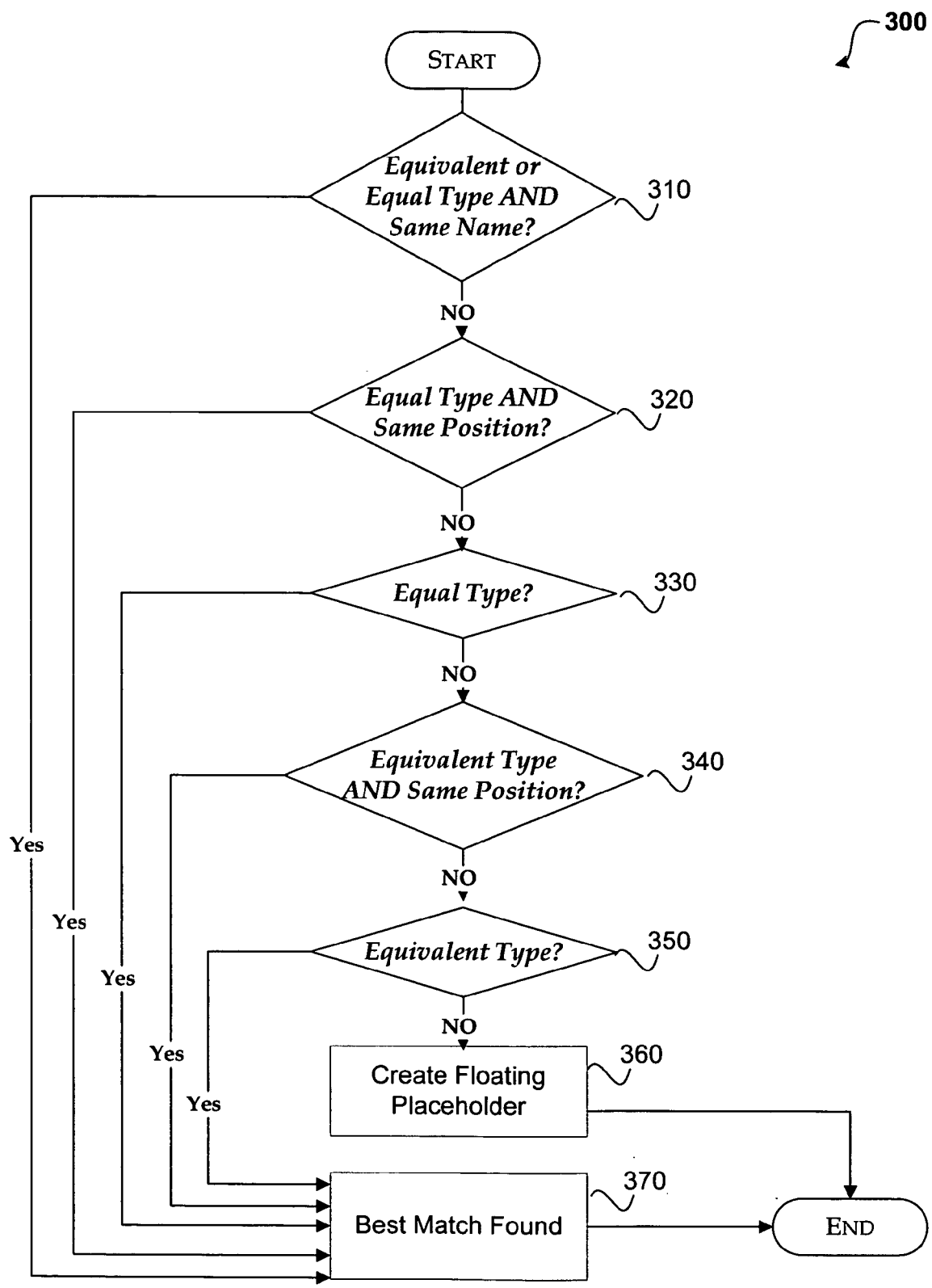
FIG. 3 shows a process for matching placeholders when a new layout is applied.

FIG. 3 shows a process for matching placeholders when a new layout is applied, in accordance with aspects of the invention. When a new layout is applied, placeholders within the original layout are matched with the placeholders in the new layout based on the following characteristics: the function of the placeholder (i.e., title, body, date/time, footer, slide number); the name of the placeholder; the type of the placeholder (i.e., chart, table, picture, text, etc.); and the position of the placeholder. The best mach for a placeholder is found by cycling through the placeholders on the original slide and matching them up against the list of unmatched placeholders in the new layout.

After a start block, the process flows to decision block 310, where a determination is made as to whether the placeholder is of an equal or equivalent type and has the same name as a placeholder within the new layout. Generally, an equivalent placeholder is a placeholder that is used to store the same or similar content. An equal type placeholder is a placeholder of the same type. According to one embodiment, the following table illustrates equivalent placeholders. Other equivalents may be used and may vary based on the slide layout program being used.

When there is a placeholder of the equivalent type or equal type and the placeholder has the same name, a match is found and the process moves to block 370.

When there is not a placeholder of the equivalent or equal type and does not have the same name, the process flows to decision block 320.

At decision block 320, a determination is made as to whether the placeholder is of an equal type and has the same position as a placeholder in the new layout. According to one embodiment, the position is a relative position of the placeholder in relation to the slide. When the placeholder is an equal type and does have the same position, a match is found and the process moves to block 370.

When the placeholder is not of an equal type and does not have the same position, a match is not found and the process moves to decision block 330.

At decision block 330, a determination is made as to whether the placeholder is of an equal type. When the placeholder is an equal type, a match is found and the process moves to block 370.

When the placeholder is not an equal type, a match is not found and the process moves to decision block 340.

At decision block 340, a determination is made as to whether the placeholder is of an equivalent type and has the same position. When the placeholder is an equivalent type and does have the same position, a match is found and the process moves to block 370.

When the placeholder is not an equivalent type and does not have the same position, a match is not found and the process moves to decision block 350.

At decision block 350, a determination is made as to whether the placeholder is of an equivalent type. When the placeholder is an equivalent type, a match is found and the process moves to block 370.

When the placeholder is not an equivalent type, a match is not found and the process moves to block 360.

At block 360, a floating placeholder is created for the placeholder since no placeholders were found that were a match. According to one embodiment, the floating placeholder is located on the new slide at the location of the placeholder on the original slide.

| Type | Title | Vertical Title | Center Title | Subtitle | Body | Vertical Body | Object (Generic) | Chart | Bitmap | Media | OrgChart | Table | Slide # | Header | Footer | Date |
|---|---|---|---|---|---|---|---|---|---|---|---|---|---|---|---|---|
| Title | X | X | X | | | | | | | | | | | | | |
| Vertical Title | X | X | X | | | | | | | | | | | | | |
| Center Title | X | X | X | | | | | | | | | | | | | |
| Subtitle | | | | X | X | X | X | | | | | | | | | |
| Body | | | | X | X | X | X | | | | | | | | | |
| Vertical Body | | | | X | X | X | X | | | | | | | | | |
| Object (Generic) | | | | T | T | T | X | O | O | O | O | O | | | | |
| Chart | | | | | | | X | X | X | X | X | X | | | | |
| Bitmap | | | | | | | X | X | X | X | X | X | | | | |
| Media | | | | | | | X | X | X | X | X | X | | | | |
| OrgChart | | | | | | | X | X | X | X | X | X | | | | |
| Table | | | | | | | X | X | X | X | X | X | | | | |
| Slide # | | | | | | | | | | | | | X | | | |
| Header | | | | | | | | | | | | | | X | | |
| Footer | | | | | | | | | | | | | | | X | |
| Date | | | | | | | | | | | | | | | | X |

X = any content type;
T = text only;
O = object only

The process then moves to and end block, where the process returns to processing other actions.

Figure 4:
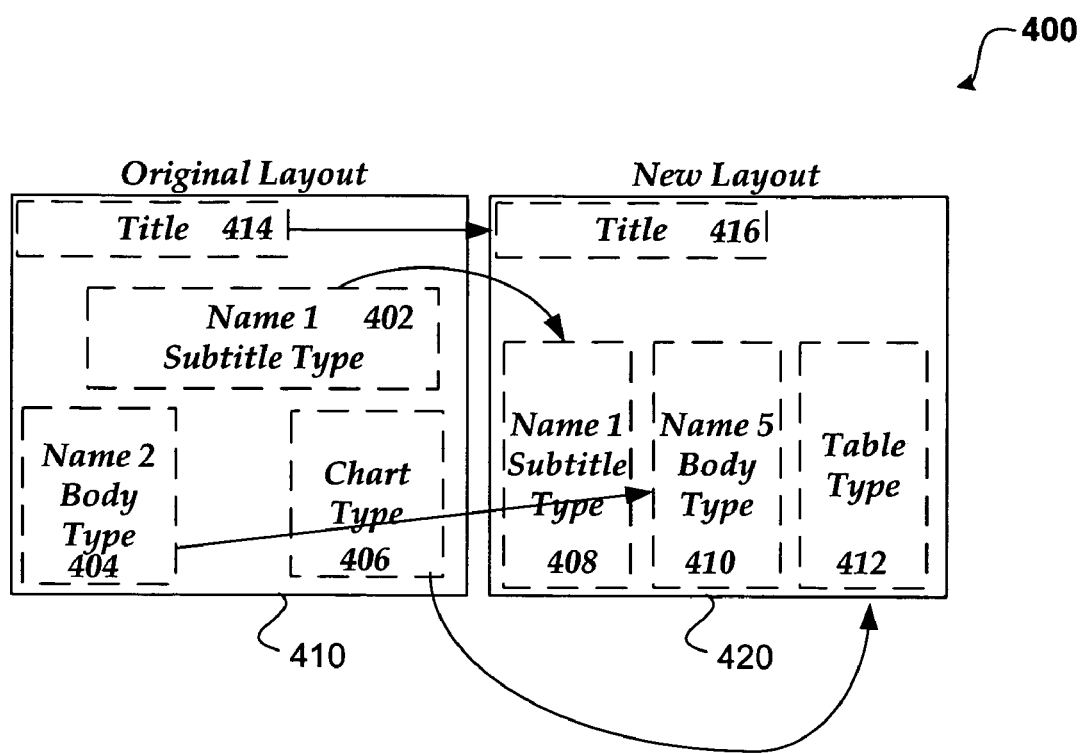
FIG. 4 illustrates applying a new layout having the same number of placeholders as the original layout.

FIG. 4 illustrates applying a new layout having the same number of placeholders as the original layout, in accordance with aspects of the present invention. When a new layout is applied to an existing slide, that slide's placeholder properties are now inherited from the new layout instead of the original layout. According to one embodiment, the inherited properties include placeholder type, text style and formatting, prompt text, shape formatting, and animation properties. Any empty placeholders in the original slide is deleted. Therefore, any formatting changes that have been made to the empty placeholder are not transferred when the new layout is applied. Formatting exceptions (text style change, fill color, line style, etc) made to the non-empty placeholders on the original layout are maintained when mapped to the placeholders on the new layout.

As discussed above, the layout algorithm cycles through all of the placeholders on the slide and determines if they match any of the placeholders in the new layout. Applying the process as described with reference to FIG. 4 results in the title placeholder (414) in the original layout being matched to the title placeholder (416) in the new layout; placeholder 402 in the original layout being matched to placeholder 408 in the new layout; placeholder 404 in the original layout being matched to placeholder 410 in the new layout; and placeholder 406 in the original layout being matched to placeholder 412 in the new layout.

A match is found by first looking for a placeholder that has the same name and is of an equivalent or equal type to a placeholder in the new layout. In the present example, placeholder 402 has the same name and is of an equal type to placeholder 408 in the new layout. Therefore, placeholder 402 is matched to placeholder 408. The remaining placeholders to be matched in the new layout are placeholder 410 and placeholder 412.

When a match is not found, a placeholder that matches the identifier of the placeholder in the original layout and who's position in the new layout equals the position in the original layout is sought. In the present example, the two remaining placeholders do not meet these criteria. According to one embodiment, a placeholder identifier is maintained for each placeholder that is used to identify the type of the place holder.

If the algorithm does not find this match, the algorithm looks for the first placeholder in the list of remaining placeholders who's identifier is equal to the original placeholder's identifier. If a match is found, the placeholder in the original layout is resized and repositioned such that it looks like the placeholder in the new layout as long as there are no exceptions. In the present example, placeholder 404 has an equal type (Body Type) to placeholder 410. Therefore, placeholder 404 in the original layout is resized to placeholder 410 in the new layout. According to one embodiment, the original placeholder's shape and formatting properties are maintained. The remaining placeholder to be matched is placeholder 412.

The algorithm then looks for the first placeholder in the list of remaining placeholders who's identifier is equivalent to the original placeholder's identifier and has the same position. In the present example, there are no matches.

The algorithm then looks for the first placeholder in the list of remaining placeholders who's identifier is equivalent to the original placeholder's identifier. In the present example, placeholder 406 is of an equivalent type to placeholder 412 (See Chart of equivalent types above).

Figure 5:
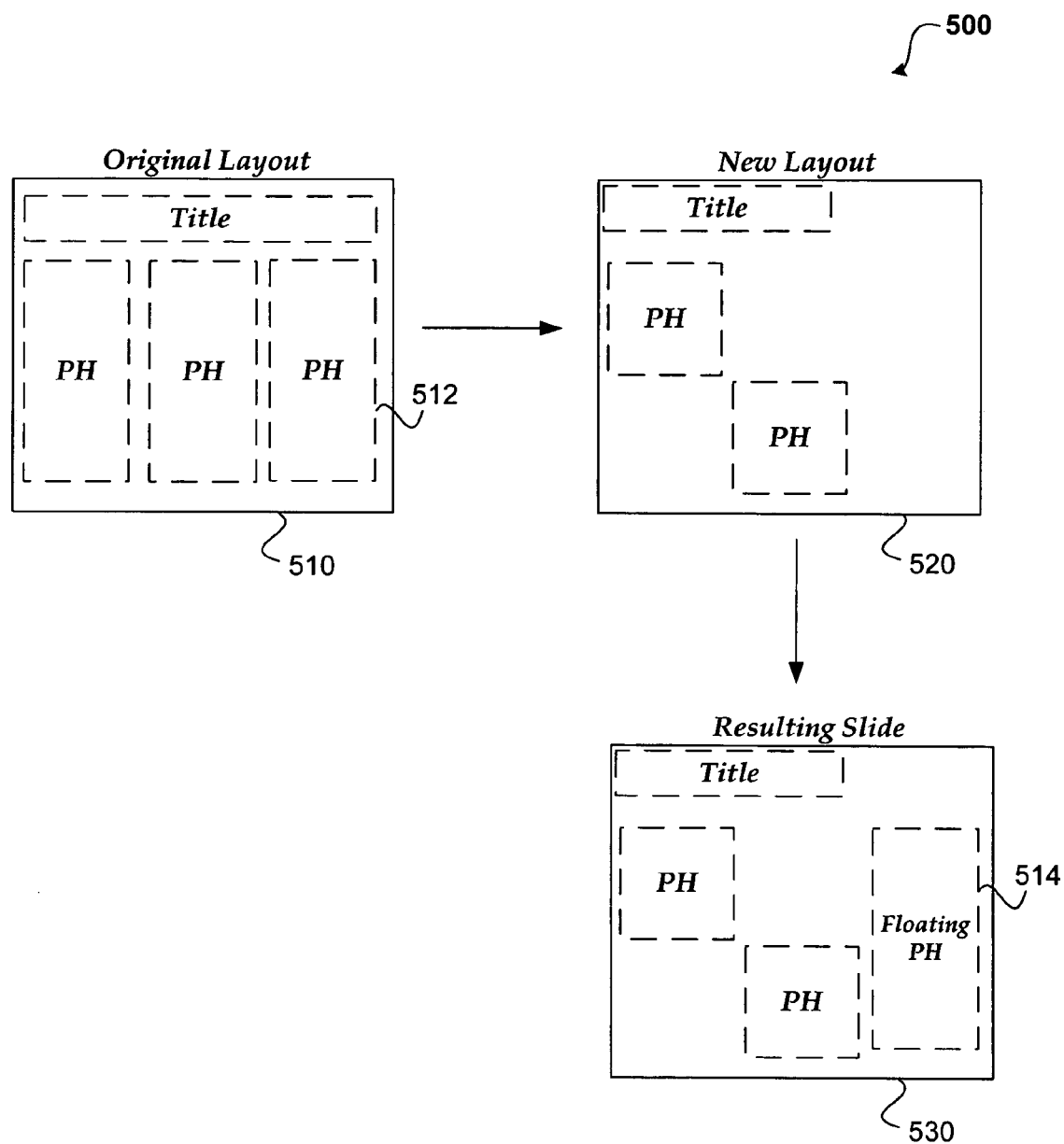
FIG. 5 illustrates applying a new layout having less placeholders than the original layout, in accordance with aspects of the invention.

When no matches are found, and the placeholder contains content, a floating placeholder is created (See FIG. 5). According to one embodiment, placeholders not having content are deleted. Any of the placeholders in the new layout that were not matched to placeholders on the original layout are also added as empty placeholders.

FIG. 5 illustrates applying a new layout having less placeholders than the original layout, in accordance with aspects of the present invention. Suppose, for example, a user decides to switch from a 3-column layout (510) to a 2-column layout (520). After applying the layout algorithm, there will still be an extra placeholder (512) that has not been matched since there are less placeholders on the new layout as compared to the original layout. Therefore, a floating placeholder (514) is created on the resulting slide (530) in the same relative location of the placeholder (512) that is removed from the original layout. A floating placeholder may overlap one of the other placeholders on the slide since floating placeholders retain their original size and position. In the present example, the extraneous placeholder (512), assuming that it contains content, is floated on the resulting slide (530) at the same relative location as it appeared on the original slide.

Illustrative Operating Environment

Figure 1:
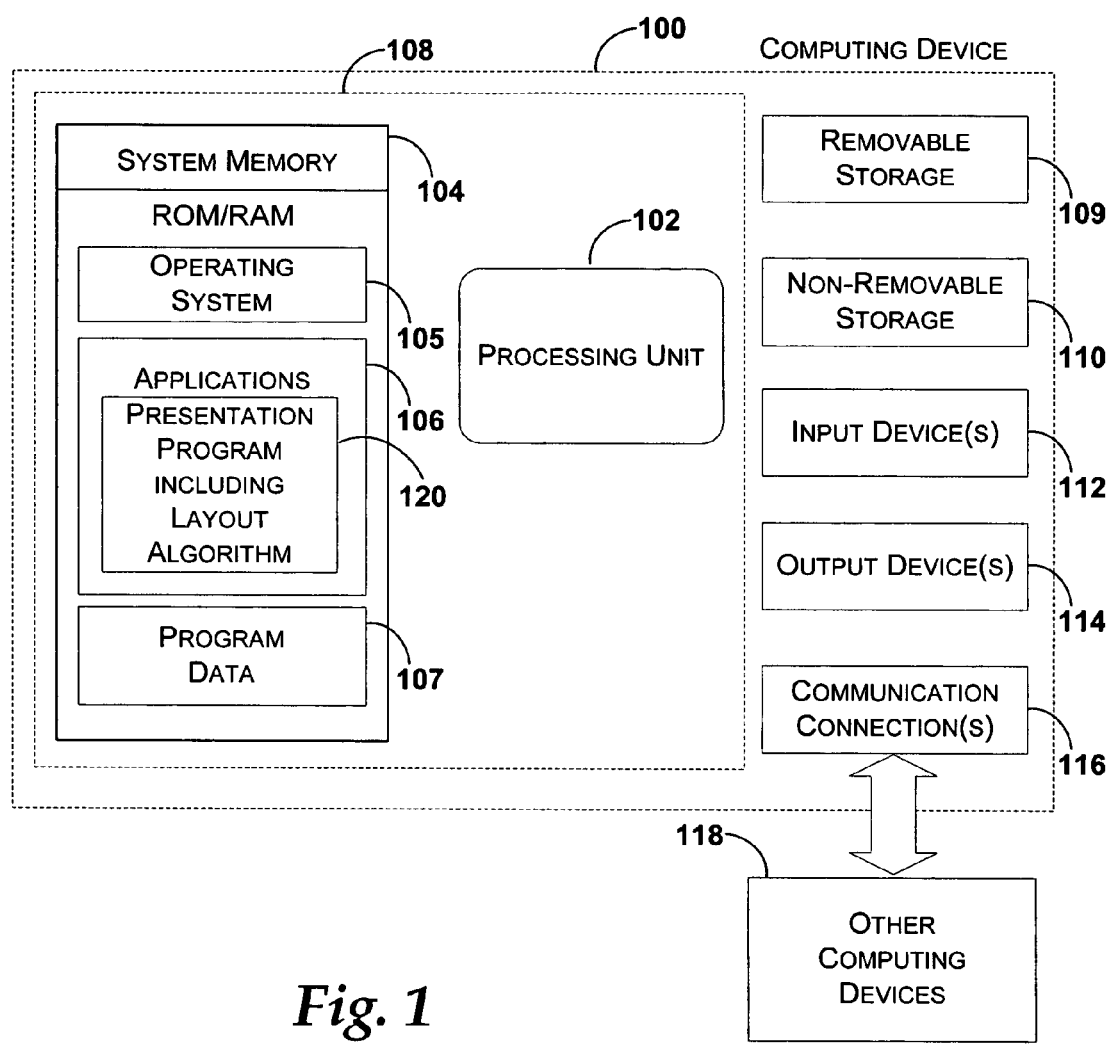
FIG. 1 illustrates an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a presentation program 120 that includes a layout algorithm. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for applying a slide layout having an arbitrary number of placeholders, comprising:
    determining characteristics for placeholders associated with an original layout for a slide; wherein the original layout is at a hierarchical level that is higher than the slide;
    determining characteristics for placeholders associated with a new layout that replaces the original layout, wherein the number of placeholders on the new layout may be fewer, the same, or more than the number of placeholders on the original layout and wherein either or both of the original layout and the new layout may be custom layouts; wherein the new layout is different from the original layout such that the new layout when applied to the slide provides a different look as compared to applying the original layout to the slide; wherein the characteristics determined include: a function of the placeholder; a name of the placeholder; a type of the placeholder; and a position of the placeholder;
    finding a match for the placeholders on the original layout to the placeholders on the new layout using the determined characteristics for the placeholder on the original layout and the determined characteristics for the placeholders on the new layout; and
    applying the new layout to the slide at the lower hierarchical level.

2. The method of claim 1, wherein finding the match for the placeholders on the original layout to the placeholders on the new layout, comprises utilizing at least two of the determined characteristics.

3. The method of claim 2, further comprising determining when a placeholder on the original layout is an equivalent type to a placeholder on the new layout.

4. The method of claim 2, further comprising determining when a placeholder on the original layout is an equal type to a placeholder on the new layout.

5. The method of claim 2, further comprising determining when a placeholder on the original layout has the same position as a placeholder on the new layout, wherein the position is based on at least one of the following: an identifier; an absolute position; and a relative position.

6. The method of claim 2, further comprising determining when a placeholder on the original layout has the same name as a placeholder on the new layout.

7. The method of claim 2, further comprising creating a floating placeholder on the new layout when a match is not found for a placeholder on the new layout.

8. The method of claim 2, further comprising moving content from a placeholder on the original layout to a placeholder within the new layout.

* * * * *